United States Patent
Sui et al.

(10) Patent No.: US 9,651,730 B2
(45) Date of Patent: May 16, 2017

(54) LIGHTING DEVICE AND LUMINAIRE

(71) Applicant: PHILIPS LIGHTING HOLDING B.V., Eindhoven (NL)

(72) Inventors: Lei Sui, Shanghai (CN); Zhi Quan Chen, Shanghai (CN); Huaizhou Liao, Shanghai (CN); Feng He, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/779,816

(22) PCT Filed: Mar. 12, 2014

(86) PCT No.: PCT/IB2014/059658
§ 371 (c)(1),
(2) Date: Sep. 24, 2015

(87) PCT Pub. No.: WO2014/155224
PCT Pub. Date: Oct. 2, 2014

(65) Prior Publication Data
US 2016/0103268 A1    Apr. 14, 2016

(30) Foreign Application Priority Data

Mar. 26, 2013   (WO) ................ PCT/CN2013/073171
Mar. 26, 2013   (WO) ................ PCT/CN2013/073187
Jun. 5, 2013   (WO) ................ PCT/CN2013/076746

(51) Int. Cl.
*F21V 8/00*       (2006.01)
*F21V 7/00*       (2006.01)
(Continued)

(52) U.S. Cl.
CPC .......... *G02B 6/0045* (2013.01); *F21V 7/0008* (2013.01); *F21V 7/0058* (2013.01);
(Continued)

(58) Field of Classification Search
CPC .. G02B 6/0045; G02B 6/0073; G02B 6/0083; F21V 23/003; F21V 7/0008; F21V 7/0058
See application file for complete search history.

(56) References Cited

U.S. PATENT DOCUMENTS

2002/0105807 A1   8/2002   Loughrey
2006/0203497 A1   9/2006   Shimaoka
(Continued)

FOREIGN PATENT DOCUMENTS

DE   10 2010 0462 55 A1   3/2012
EP   1826474 A1   8/2007
(Continued)

*Primary Examiner* — Thomas M Sember

(57) ABSTRACT

Disclosed is a lighting device comprising an exit window (30); a plurality of solid state lighting elements (20) arranged in an annular pattern; an optical element (10, 50) for redirecting the luminous output of the solid state lighting elements towards said exit window, the shape of said optical element defining a cavity (15) on a central axis of the lighting device, said cavity being shielded from said luminous output; and a driver circuit (40) for driving at least some of said solid state lighting elements located in said cavity. A luminaire including such a lighting device is also disclosed.

6 Claims, 3 Drawing Sheets

(51) Int. Cl.
*F21V 23/00* (2015.01)
*F21Y 103/30* (2016.01)
*F21Y 103/33* (2016.01)

(52) U.S. Cl.
CPC .......... *F21V 23/003* (2013.01); *G02B 6/0073* (2013.01); *G02B 6/0083* (2013.01); *F21Y 2103/30* (2016.08); *F21Y 2103/33* (2016.08)

(56) References Cited

U.S. PATENT DOCUMENTS

| | | | |
|---|---|---|---|
| 2010/0123397 A1* | 5/2010 | Tian | F21V 5/04 |
| | | | 315/113 |
| 2012/0002416 A1 | 1/2012 | Kong, II | |
| 2012/0051028 A1 | 3/2012 | Montagne | |

FOREIGN PATENT DOCUMENTS

| | | |
|---|---|---|
| EP | 2306072 A1 | 4/2011 |
| EP | 2 431 655 A2 | 3/2012 |
| JP | 2009 117346 A | 5/2009 |
| JP | 2012104476 A | 5/2012 |
| JP | 2012123979 A | 6/2012 |
| WO | 2008/050783 A1 | 5/2008 |
| WO | 2012/063240 A1 | 5/2012 |
| WO | 2014/155241 A1 | 3/2014 |
| WO | 2014/155281 A1 | 3/2014 |

* cited by examiner

LIGHTING DEVICE AND LUMINAIRE

CROSS-REFERENCE TO PRIOR APPLICATIONS

This application is the U.S. National Phase application under 35 U.S.C. §371 of International Application No. PCT/IB2014/059658, filed on Mar. 12, 2014, which claim the benefit of International Applications Nos. PCT/CN2013/073187 filed Mar. 26, 2013, PCT/CN2013/073171 filed Mar. 26, 2013 and PCT/CN2013/076746 filed Jun. 5, 2013. These applications are hereby incorporated by reference herein.

FIELD OF THE INVENTION

The present invention relates to a lighting device having an exit window; a plurality of solid state lighting elements arranged in an annular pattern and an optical element for redirecting the luminous output of the solid state lighting elements towards said exit window.

The present invention further relates to a luminaire including such a lighting device.

BACKGROUND OF THE INVENTION

With a continuously growing population, it is becoming increasingly difficult to meet the world's energy needs as well as to control carbon emissions to kerb greenhouse gas emissions that are considered responsible for global warming phenomena. These concerns have triggered a drive towards a more efficient use of electricity in an attempt to reduce energy consumption.

One such area of concern is lighting applications, either in domestic or commercial settings. There is a clear trend towards the replacement of traditional incandescent light bulbs, which are notoriously energy inefficient, with more energy efficient replacements. Indeed, in many jurisdictions the production and retailing of incandescent light bulbs has been outlawed, thus forcing consumers to buy energy-efficient alternatives, e.g. when replacing incandescent light bulbs.

A particular promising alternative is provided by solid state lighting (SSL) devices, which can produce a unit luminous output at a fraction of the energy cost of incandescent light bulbs. An example of such a SSL element is a light emitting diode.

A drawback of SSL element-based lighting devices is that the compatibility with incandescent light-based device fittings, e.g. luminaries, is not perfect, which hampers the market penetration of the SSL element-based lighting devices. SSL element-based lighting devices typically require one or more driver circuits for driving the SSL elements, which when integrated into the lighting device can increase the size of the lighting device to such an extent that the lighting device cannot be retrofitted into existing luminaries. This problem may be solved by using external driver circuits, but this can be cumbersome if no recess is available to fit the external driver circuit, and may prohibit domestic end users from installing the SSL element-based lighting devices in case they are not competent or prohibited by law from doing so for health and safety reasons.

SUMMARY OF THE INVENTION

The present invention seeks to provide a more compact lighting device including a driver circuit.

The present invention further seeks to provide a luminaire including such a more compact lighting device.

According to an aspect of the present invention, there is provided a lighting device comprising an exit window; a plurality of solid state lighting elements arranged in an annular pattern; an optical element for redirecting the luminous output of the solid state lighting (SSL) elements towards said exit window, the shape of said optical element defining a cavity on a central axis of the lighting device, said cavity being shielded from said luminous output; and a driver circuit for driving at least some of said solid state lighting elements located in said cavity. By integration of the driver circuit within a central portion of the lighting device that is shielded from the luminous output of the SSL elements, a lighting device with integrated driver circuit is produced that has a comparable size to lighting devices with external driver circuits.

In an embodiment, the optical element comprises a reflective element having a reflective hollow central portion extending towards the exit window, said cavity being delimited by the hollow reflective central portion.

The reflective hollow central portion may comprise a generally convex or concave surface to shape the luminous output of the lighting device depending on the angle of incident of the luminous output onto the surface.

In an embodiment, the reflective element further comprising an annular array of reflective ellipsoid surfaces extending radially from said reflective conical central section, each reflective ellipsoid surface creating a first focal point inside the reflective conical central section and a second focal point; and each of said solid state lighting elements is located at the second focal point of each of said reflective ellipsoid surfaces and arranged to emit light towards said reflective ellipsoid surface. This allows for a high density of SSL elements to be integrated into the lighting device, such that the lighting device not only is compact but is capable of producing a high light intensity at the same time.

In an alternative embodiment, the lighting device further comprises a side wall extending between the reflective element including the reflective hollow central portion comprising a generally concave surface and the exit window, said side wall carrying the plurality of solid state lighting elements arranged to direct their luminous output towards said generally concave surface. It has been surprisingly found that the combination of the side-emitting SSL elements and a concave central reflective element produces a compact lighting device that can have a high luminous output due to the annular arrangement of the solid state lighting elements near the periphery of the lighting device, which can be delivered within a very small beam angle due to the concave nature of the reflective element.

The reflective element may further comprise an annular optical cavity delimited by the reflective hollow central portion and a side wall opposite said reflective hollow central portion, wherein the solid state lighting elements are mounted in the annular optical cavity. In this embodiment the luminous surfaces of the SSL elements may face the exit window, with the annular optical cavity limiting the beam angle produced by the lighting device.

The exit window may comprise a diffuser supported by said side wall to improve the appearance of the luminous output of the lighting device, e.g. to improve the colour over angle (COA) of the lighting device.

The reflective element advantageously is formed from a metal sheet, preferably a single metal sheet, as this yields a low-cost reflective element.

In an alternative embodiment, the optical element comprises an annular light guide plate having a central recess defining said cavity, and wherein the solid state lighting elements are arranged along the outer perimeter of the annular light guide plate, the solid state lighting elements being arranged to couple their luminous output into the annular light guide plate. Such a lighting device is particularly compact.

The lighting device may further comprise a housing, wherein the solid state lighting elements are mounted on said housing. This ensures that the lighting device can be manufactured at low cost.

In an embodiment, the driver circuit has a circular shape matching said central recess to ensure a good fit of the driver circuit in the central recess.

The lighting device may further comprise a first reflective member in between the driver circuit and the annular light guide plate to prevent the driver circuit from absorbing part of the luminous output, thus improving the efficiency of the lighting device.

The lighting device may further comprise a further reflective member on a major surface of the annular light guide plate such that the annular light guide plate is located in between the further reflective member and the exit window. This prevents light being absorbed by the housing behind the annular light guide, thus improving the efficiency of the lighting device.

The lighting device may be a light bulb, such as a spot light bulb. Suitable bulb sizes include but are not limited to MR11, MR16, GU10, AR111, Par38, Par30, BR30, BR40, R20, and R50 light bulbs.

In accordance with another aspect of the present invention, there is provided a luminaire comprising the lighting device according to an embodiment of the present invention. Such a luminaire may for instance be a holder of the lighting device or an apparatus into which the lighting device is integrated.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
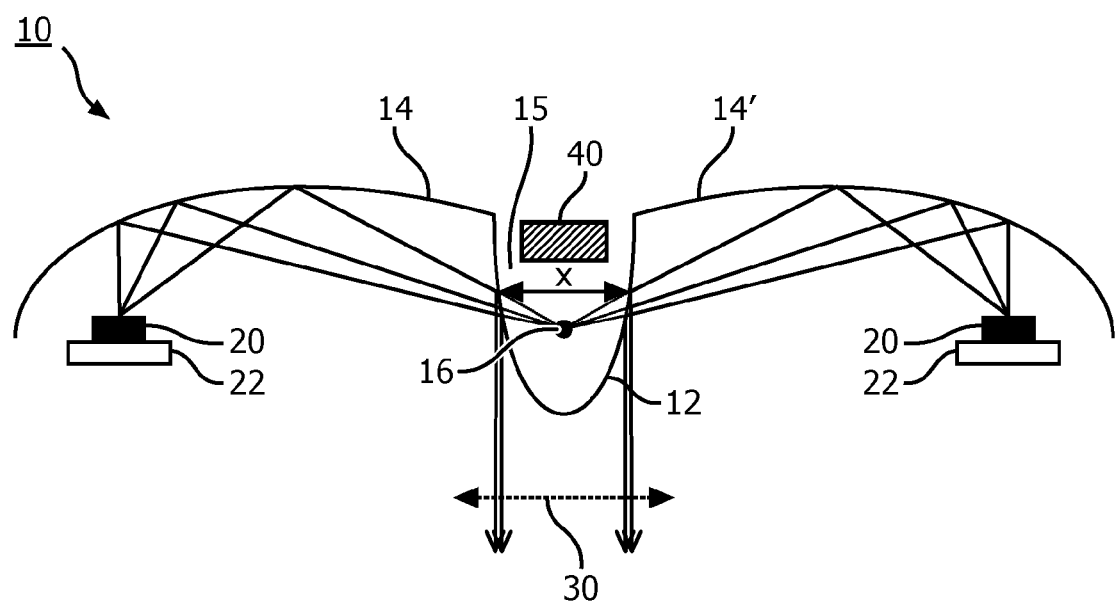
FIG. 1 schematically depicts a cross-section of a lighting device according to an embodiment of the present invention.

It should be understood that the Figures are merely schematic and are not drawn to scale. It should also be understood that the same reference numerals are used throughout the Figures to indicate the same or similar parts.

In the Figures, light paths generated by SSL elements and optical elements are shows as solid arrows.

FIG. 1 schematically depicts a cross-section of a lighting device according to an embodiment of the present invention. The lighting device comprises a reflective element 10 comprising a reflective convex conical central section 12 having a conic constant in the range of −0.7 to −1.3. The conic constant, which is also known as the Schwarzschild constant, defines the eccentricity of the conical central section 12. The conic constant may be expressed by the following formula in the x,y plane:

$$y^2-2Rx+(K+1)x^2=0$$

in which R is the radius of the curvature at x=0 and K is the conic constant.

The reflective element 10 further comprises an array of reflective ellipsoid surfaces that extend radially from said reflective conical central section. A first reflective ellipsoid surface 14 and a second reflective ellipsoid surface 14' that each radially extend outwardly from the reflective conical central section 12 are shown in FIG. 1. The reflective conical central section 12 and the respective reflective ellipsoid surfaces 14, 14' may be individually realized in any suitable reflective material, e.g. a polymer material such as polycarbonate covered with a reflective coating such as optical grade silver or aluminium. The polymer material may be a composite polymer material. For instance, the composite polymer material may include up to 20% by weight of glass fiber to improve the thermal characteristics of the material, e.g. reduce the thermal expansion coefficient of the material. Specifically, the polymer material may be polycarbonate optionally comprising up to 20% by weight of glass fiber.

The reflective ellipsoid surfaces 14, 14' are arranged relative to the reflective conical central section 12 such that each reflective ellipsoid surface 14, 14' creates a first focal point inside the reflective conical central section 12 and a second focal point outside the reflective conical central section 12.

In an embodiment, at least some of the first focal points of the respective reflective ellipsoid surfaces 14, 14' may coincide in point 16 within the reflective conical central section 12. In an embodiment, point 16 is the focal point of the reflective conical central section 12. Preferably, all of the first focal points of the respective reflective ellipsoid surfaces 14, 14' coincide in a focal point 16 of the reflective conical central section 12.

Respective solid state lighting (SSL) elements 20, which may be mounted on a single carrier 22 or on respective carriers are placed at the various second focal points of the reflective ellipsoid surfaces 14, 14' and are arranged such that the luminous surface of each of the SSL elements 20 faces the reflective ellipsoid surface corresponding to the second focal point at which the solid state lighting element 20 is placed. In other words, the respective SSL elements 20 are arranged in an uplighter configuration, i.e. the luminous output is directed away from the exit window 30. In an embodiment, the SSL elements 20 are light-emitting diodes (LEDs).

Due to the ellipsoid nature of the reflective ellipsoid surfaces 14, 14' and the placement of the SSL elements 20 at the respective second focal points of these reflective ellipsoid surfaces 14, 14', the luminous output of the SSL elements 20 is redirected by the reflective ellipsoid surfaces 14, 14' towards the respective first focal points of the reflective ellipsoid surfaces 14, 14', which lie within the reflective conical central section 12. This ensures that substantially all of the luminous output of the SSL elements 20 is redirected onto the convex surface of the reflective conical central section 12. In other words, the reflective element 10 forms a confocal reflective element in which the first reflection is provided by the reflective ellipsoid surfaces 14, 14' and the second reflection is provided by the reflective conical central section 12.

Due to the conic constant in the range of −0.7 to −1.3 of the reflective conical central section 12, a highly collimated luminous output is generated by the reflective conical central section 12, as the reflective conical central section 12 redirects the luminous output of the SSL elements 20, 20' through an exit window 30 of the lighting device, which exit window 30 is arranged opposite the reflective conical central section 12 of the reflective element 10.

The central portion 12 of the reflective element 10 is hollow, thereby defining a cavity 15 delimited by the central portion 12 and a further surface (not shown), which further surface may be a support and/or part of the housing of the lighting device. The present invention is based on the realization that this cavity 15 may be utilized by placing the driver circuit 40 for at least some of the SSL elements 20 in the cavity 15. The driver circuit 40 may be secured in the cavity 15 in any suitable manner, e.g. by screwing or adhering the driver circuit 40 to the further surface, e.g. to part of the housing of the lighting device 10.

Figure 2:
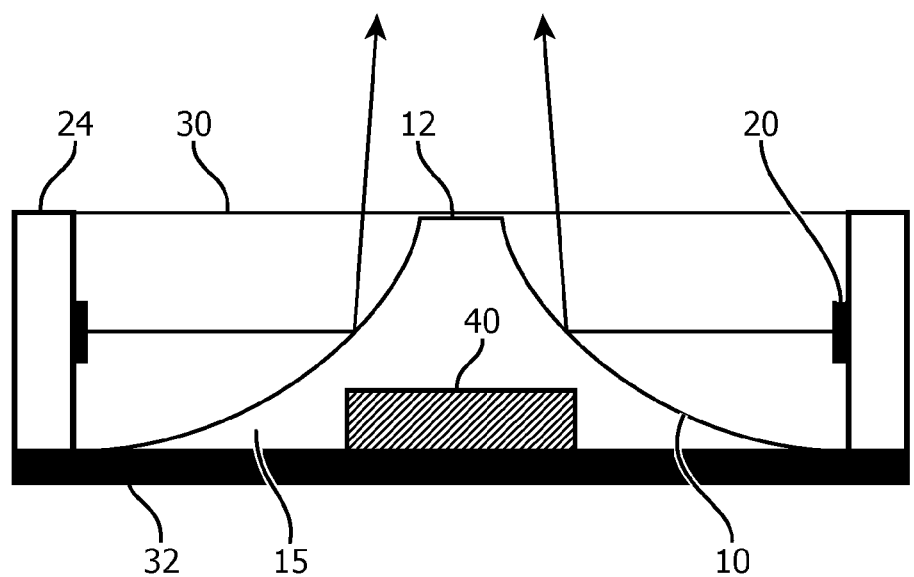
FIG. 2 schematically depicts a cross-section of a lighting device according to another embodiment of the present invention.

FIG. 2 schematically depicts an embodiment of a lighting device in which the SSL elements 20 are arranged in a side-emitting configuration relative to the exit window 30. The lighting device comprises an exit surface or window 30 opposite a further surface 32, such as part of a support substrate and/or of the housing of the lighting device 10. The exit window 30 is supported by a side wall structure 24 that extends from the further surface 32 to the exit window 30. The side wall structure 24 may have an annular shape or may have a polygonal shape. The exit window 30 typically comprises a transparent material, e.g. a transparent polymer material or glass, and may optionally contain any suitable beam shaping elements such as a microlens array (not shown).

The further surface 32 further carries or comprises a centrally located reflective element 10. The reflective element 10 comprises a concave reflective surface, which concave surface preferably has a parabolic shape, when viewed in cross-section as shown in FIG. 2, although other concave surfaces may also be contemplated. For the avoidance of doubt, it is explained that the overall shape of the reflective element 10 is not parabolic, as this would lead to a convex reflective element. Instead, the cross-section of the reflective element 10 can be seen to have two surface sections both extending from the further surface 32 towards the exit window 30, with each of these surface sections. In an embodiment, the reflective element 10 has a concave conical shape, which may be truncated, as shown in FIG. 2. Alternatively, the reflective element 10 may have a complete, i.e. non-truncated, concave conical shape.

The side wall structure 24 typically comprises a plurality of solid state lighting (SSL) elements 20, e.g. LEDs, which may be spaced in an equidistant manner. As mentioned before, the side wall structure 24 may have an annular shape or may have a polygonal shape. A polygonal shape has the advantage that the carriers of the SSL elements 20, e.g. the printed circuit boards (PCBs), can be more easily mounted onto the side wall structure 24.

The SSL elements 20 may be placed onto the side wall structure 24 in any suitable manner. For instance, the SSL elements 22 may be integrated in the annular or polygonal side wall 20 or may be fixed to, e.g. adhered to or otherwise mounted on, the side wall 22. The SSL elements 22 are arranged such that the luminous output of the SSL elements 22 is directed towards the reflective element 40. In other words, the luminous surfaces of the respective SSL elements 20 are arranged such that these surfaces face the reflective element 12.

The reflective element 10 preferably is arranged to redirect the luminous output of the SSL elements 20 through the exit surface 30 in a substantially collimated fashion, which is achieved by the concave shape of the surface of the reflective surface 10, thus producing a lighting device 10 capable of producing beam angles of 40° or less, more preferably 30° or less.

A central section 12 of the reflective element 10 is hollow, thereby defining a cavity 15 delimited by the further surface 32 and the reflective element 10. The present invention is based on the realization that this cavity 15 may be utilized by placing the driver circuit 40 for at least some of the SSL elements 20 in the cavity 15. The driver circuit 40 may be secured in the cavity 15 in any suitable manner, e.g. by screwing or adhering the driver circuit 40 to the further surface 32, e.g. part of the housing of the lighting device. In an embodiment, the reflective element 10 is formed from a single sheet of metal, e.g. aluminium.

Figure 3:
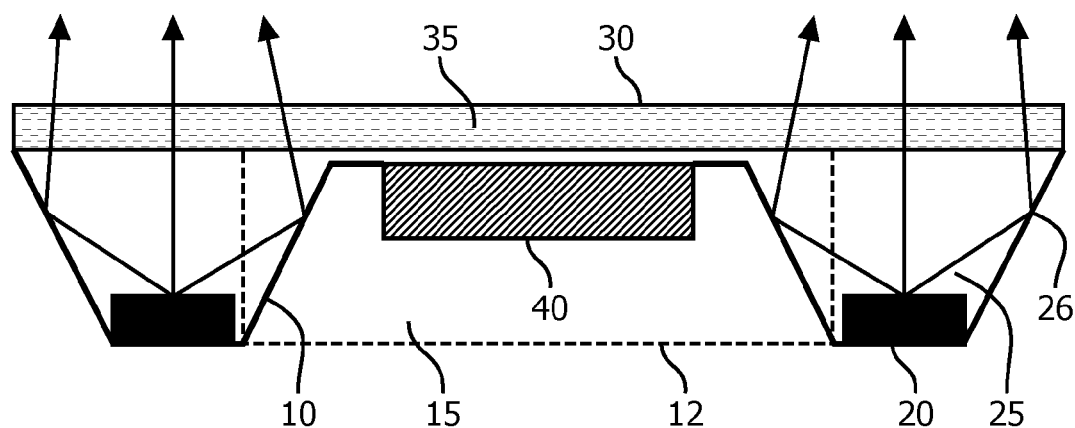
FIG. 3 schematically depicts a cross-section of a lighting device according to yet another embodiment of the present invention.
Figure 4:
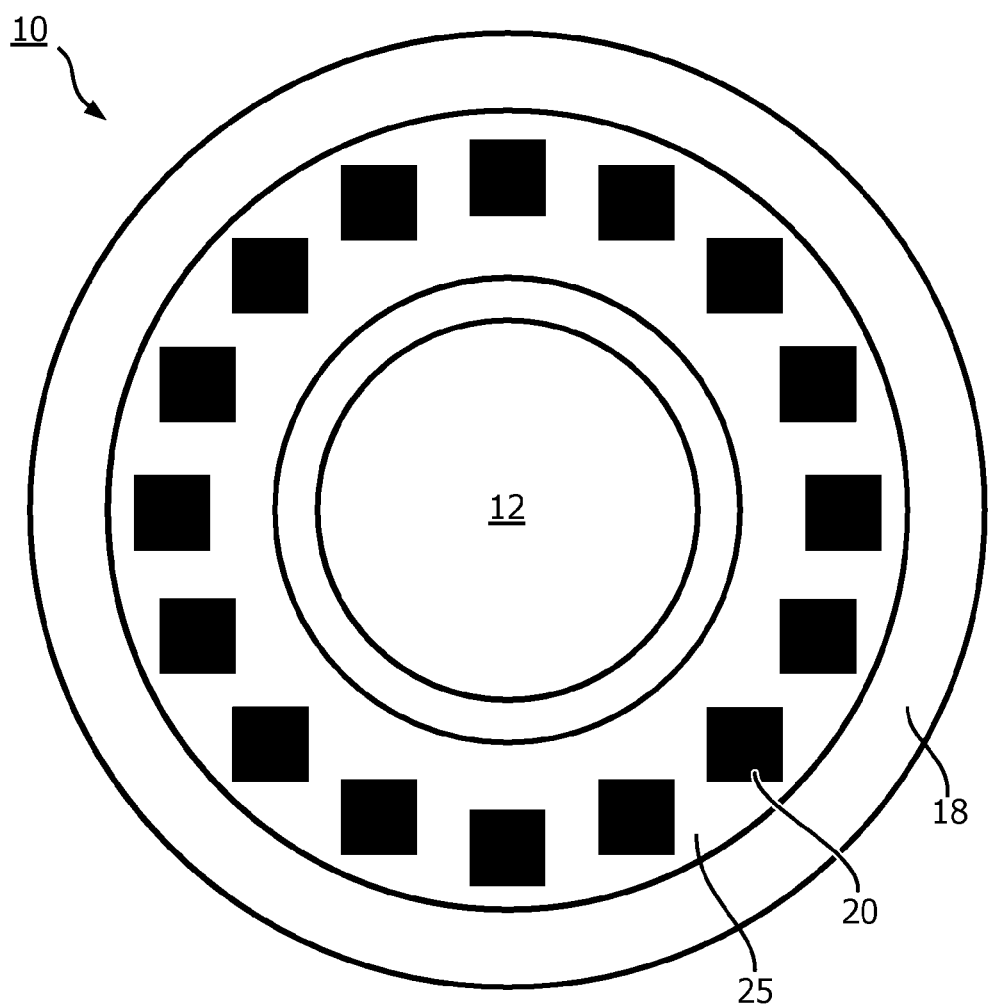
FIG. 4 schematically depicts a top view of the lighting device of FIG. 3.

FIG. 3 shows a cross-section and FIG. 4 a top view of a lighting device according to yet another embodiment of the present invention, in which the SSL elements are arranged in a downward lighting configuration, i.e. the respective luminous surfaces of the SSL elements 20 face the exit window 30. In this embodiment, the lighting device comprises a reflective element 10 that preferably is formed from a single sheet of metal such as aluminium, e.g. through stamping. The reflective element 10 comprises an annular optical cavity 25 in which the SSL elements 20 are mounted such that their luminous surfaces face the exit window 30 of the lighting device. The SSL elements 20 may be mounted onto the reflective element 10 in any suitable manner, e.g. through soldering or on a carrier that is affixed to the annular optical cavity 25.

The annular optical cavity 25 comprises a side wall 26 for reflecting light produced by the SSL elements 20 under shallow angles towards the exit window 30. The side wall 26 may have any suitable surface profile, e.g. a linear profile or a convex or concave profile, which surface profile may be selected to achieve a desired collimation characteristics of the reflective element 10.

In an embodiment the reflective element 10 also acts as the heat sink of the SSL elements 20 and/or may form part of the housing of the lighting device. The lighting device may further comprise a diffuser 35 as part of the light exit window 30 for reducing the glare and/or COA effects of the lighting device.

The reflective element 10 further comprises a central portion 12 including a cavity 15 delimited by the side wall 26. In other words, the side wall 25 shields the cavity 15 from the luminous output of the SSL elements 20. The present invention is based on the realization that this cavity 15 may be utilized by placing the driver circuit 40 for at least some of the SSL elements 20 in the cavity 15. The driver circuit 40 may be secured in the cavity 15 in any suitable manner, e.g. by screwing or adhering the driver circuit 40 to the reflective element 10 or to a part of the housing of the lighting device.

Figure 5:
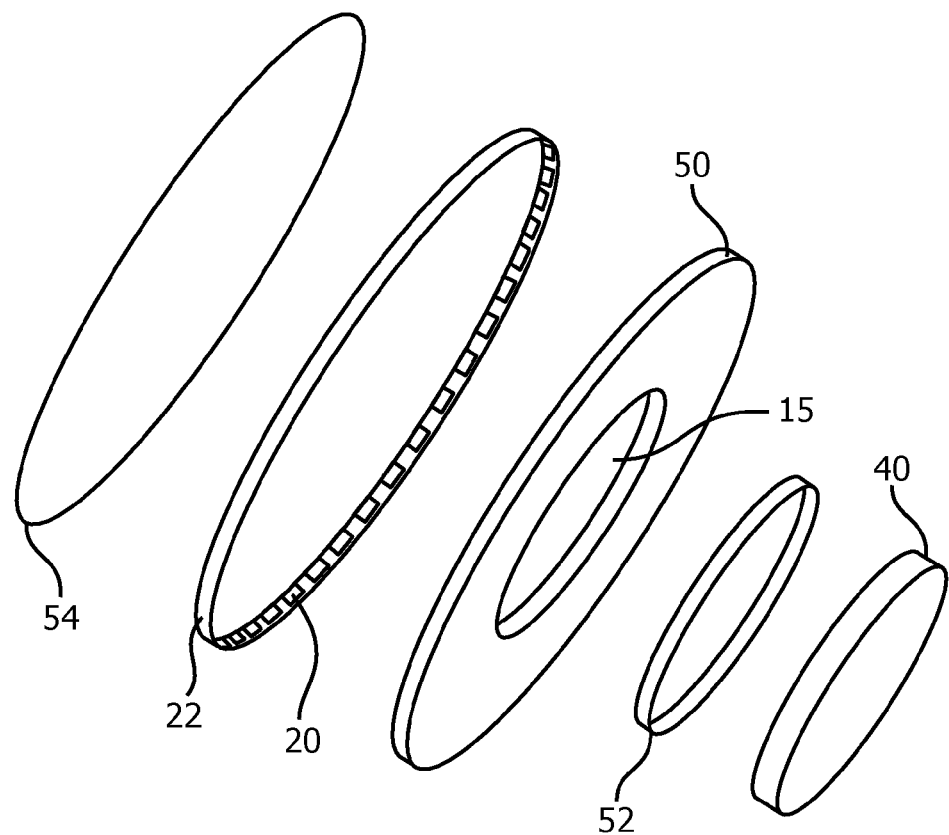
FIG. 5 schematically depicts an exploded view of a lighting device according to yet another embodiment of the present invention.
Figure 6:
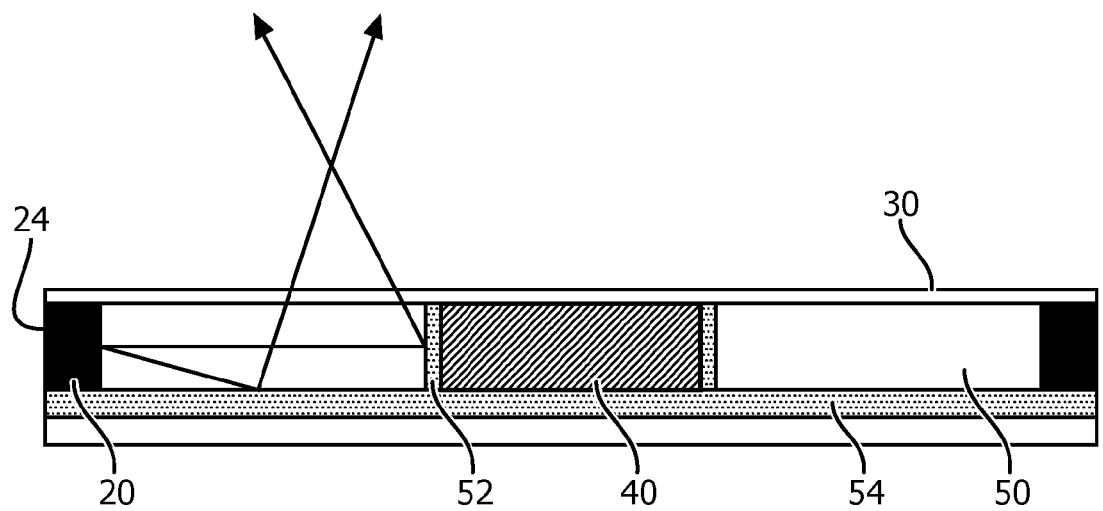
FIG. 6 schematically depicts a cross-section of a lighting device of FIG. 5.

In the embodiments shown in FIG. 1-4, the optical element defining and delimiting a cavity 15 on the central axis of the lighting device of the present invention is a reflective element 10. However, it should be understood that the present invention is not limited to reflective optical elements. FIG. 5 schematically depicts an exploded view and FIG. 6 schematically depicts a cross-section of a lighting device according to yet another embodiment of the present invention, in which a non-reflective optical element defines a central cavity in which a driver circuit for SSL elements is housed.

In this embodiment, optical element comprises an annular light guide plate 50 having a central recess defining said cavity 15. The SSL elements 20 are arranged along the outer perimeter of the annular light guide plate 50 such that the luminous surfaces of the SSL elements 20 face the outer edge of the annular light guide plate 50, i.e. the SSL elements 20 are arranged to couple their luminous output into the annular light guide plate 50.

In a preferred embodiment, the SSL elements 20 are mounted on a side wall 24 of the housing of the lighting device, e.g. through soldering in case of a metal housing. In this case the housing may also act as the heat sink of the SSL elements 20. In an alternative embodiment, the SSL elements 20 are mounted on an annular carrier 22 fitted around the outer edge of the annular light guide plate 50, in which case the carrier 22 is fitted against the side wall 24.

An exposed major surface of the annular light guide plate 50 may define the light exit window 30 of the lighting device. Alternatively, the lighting device may comprise additional optical elements (not shown) such as a diffuser or a micro lens array on a first major surface of the annular light guide plate 50, in which case the one or more additional optical elements may define the light exit window 30.

The lighting device may comprise an annular reflective member 52, e.g. a reflective foil or paint, on the inner edge of the annular light guide plate 50 to prevent light from escaping the annular light guide plate 50 via the inner edge. The lighting device may further comprise a second reflective member 54, e.g. a reflective foil or paint, on the second major surface of the annular light guide plate 50 to prevent light from escaping the annular light guide plate 50 via the second major surface. For the avoidance of doubt it is noted that the second major surface of the annular light guide plate 50 lies opposite its first major surface such that the annular light guide plate 50 is located in between the second reflective member 54 and the exit window 30.

The annular light guide plate 50 defines a cavity 15 in which the driver circuit 40 of the SSL elements 20 is fitted. The driver circuit 40 may be secured in the cavity 15 in any suitable manner, e.g. by screwing or adhering the driver circuit 40 to a part of the housing of the lighting device, e.g. through the second reflective element 54. It will be understood that the annular reflective member 52 shields the driver circuit 40 from the luminous output of the SSL elements 20.

In summary, embodiments of the present invention provide a lighting device such as a light bulb or the like in which a cavity 15 on a central axis of the lighting device houses the driver circuit 40 of the SSL elements 20 of the lighting device, such that a compact lighting device with an integrated driver circuit 40 is obtained. The driver circuit 40 may have a substantially circular shape such that it matches the central recess defining the cavity 15 of the annular light guide plate 50.

The lighting device according to embodiments of the present invention may be a light bulb, more preferably a spot light bulb. The lighting device according to embodiments of the present invention may be advantageously included in a luminaire such as a holder of the lighting device, e.g. a ceiling light fitting, or an apparatus into which the lighting device is integrated, e.g. a cooker hood or the like.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting device comprising:

an exit window;

a plurality of solid state lighting elements arranged in an annular pattern;

an optical element for redirecting a luminous output of the solid state lighting elements towards said exit window, a shape of said optical element defining a cavity on a central axis of the lighting device, said cavity being shielded from said luminous output; and a driver circuit for driving at least some of said solid state lighting elements located in said cavity;

wherein the optical element comprises an annular light guide plate having an outer annular perimeter edge and a central recess defining said cavity and an inner annular edge; and wherein the solid state lighting elements are arranged along the outer annular perimeter edge of the annular light guide plate, the solid state lighting elements being arranged to couple the luminous output into the outer annular perimeter edge of the annular light guide plate.

2. The lighting device of claim 1, further comprising a housing, wherein the solid state lighting elements are mounted on said housing.

3. The lighting device of claim 1, wherein the driver circuit has a circular shape matching said central recess.

4. The lighting device of claim 1, further comprising a first reflective member in between the driver circuit and the annular light guide plate.

5. The lighting device of claim 1, further comprising a further reflective member on a major surface of the annular light guide plate such that the annular light guide plate is located in between the further reflective member and the exit window.

6. A luminaire comprising the lighting device of claim 1.

* * * * *